United States Patent
Burenkov et al.

(10) Patent No.: US 12,141,269 B2
(45) Date of Patent: Nov. 12, 2024

(54) SYSTEM AND METHOD FOR BUILDING A SECURITY MONITOR

(71) Applicant: AO Kaspersky Lab, Moscow (RU)

(72) Inventors: Vladimir S. Burenkov, Moscow (RU); Alexander A. Bondarenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 203 days.

(21) Appl. No.: 17/711,399

(22) Filed: Apr. 1, 2022

(65) Prior Publication Data
US 2022/0382855 A1    Dec. 1, 2022

(30) Foreign Application Priority Data
May 27, 2021   (RU) .......................... RU2021115238

(51) Int. Cl.
| | |
|---|---|
| G06F 15/16 | (2006.01) |
| G06F 9/54 | (2006.01) |
| G06F 21/53 | (2013.01) |
| H04L 29/06 | (2006.01) |

(52) U.S. Cl.
CPC .............. *G06F 21/53* (2013.01); *G06F 9/546* (2013.01); *G06F 2221/034* (2013.01)

(58) Field of Classification Search
CPC ..... G06F 21/53; G06F 9/546; G06F 2221/034
USPC ......................................................... 709/223
See application file for complete search history.

(56) References Cited

U.S. PATENT DOCUMENTS

| | | | |
|---|---|---|---|
| 7,103,631 B1 * | 9/2006 | van der Veen | G06F 9/52 709/205 |
| 8,234,686 B2 * | 7/2012 | Alvermann | H04L 63/20 713/160 |
| 8,650,620 B2 | 2/2014 | Chawla et al. | |
| 10,795,739 B1 * | 10/2020 | Klee | G06F 21/52 |

(Continued)

FOREIGN PATENT DOCUMENTS

| | | | | |
|---|---|---|---|---|
| EP | 689138 A2 * | 12/1995 | | G06F 9/54 |
| EP | 1524597 A1 * | 4/2005 | | G06F 9/463 |

(Continued)

OTHER PUBLICATIONS

Measures to Improve Security in a Microkernel Operating System (Year: 2011).*

(Continued)

*Primary Examiner* — Hamza N Algibhah
(74) *Attorney, Agent, or Firm* — ArentFox Schiff LLP; Michael Fainberg

(57) ABSTRACT

A method for building a security monitor includes identifying one or more objects of a microkernel Operating System (OS) participating in transmission of an Inter Process Communication (IPC) message. The one or more OS objects include one or more processes and/or one or more applications executed by the microkernel OS. One or more security policies associated with the identified microkernel OS objects are selected from a security policy database. A policy verification module is configured based on the selected security policies to generate a decision related to controlling the transmission of the IPC message. A security monitor is generated using the configured policy verification module to control the transmission of the message based on the decision generated by the policy verification module.

21 Claims, 6 Drawing Sheets

(56) References Cited

U.S. PATENT DOCUMENTS

| | | | | |
|---|---|---|---|---|
| 10,826,933 | B1 * | 11/2020 | Ismael | H04L 63/145 |
| 11,113,128 | B1 * | 9/2021 | Klee | G06F 9/4812 |
| 11,604,684 | B1 * | 3/2023 | Hinrichs | G06F 16/185 |
| 2010/0121927 | A1 * | 5/2010 | Zhang | G06F 9/54 |
| | | | | 726/1 |
| 2017/0005983 | A1 | 1/2017 | Doukhvalov et al. | |

FOREIGN PATENT DOCUMENTS

| | | | | |
|---|---|---|---|---|
| WO | WO-2005036397 A2 * | 4/2005 | | G06F 9/463 |
| WO | WO-2020030270 A1 * | 2/2020 | | G06F 21/53 |

OTHER PUBLICATIONS

Improving IPC by Kernel Design (Year: 1993).*
Communication in Microkernel-Based Operating Systems (Year: 2011).*
Applying Formal Verification to Microkernel IPC at Meta (Year: 2022).*
SkyBridge: Fast and Secure Inter-Process Communication for Microkernels (Year: 2019).*
Klein Gerwin et al: "Formally verified software in the real world", Communications of the ACM, [Online] vol. 61, No. 10, Sep. 26, 2018 (Sep. 26, 2018). pp. 68-77.
Habeeb Richard: "Improving the Security of Building Automation Systems Through an seL4-based Communication Frame", Mar. 31, 2018 (Mar. 31, 2018), XP055967100, Retrieved from the Internet: URL:https://digitalcommons.usf.edu/cgi/vie.

* cited by examiner

SYSTEM AND METHOD FOR BUILDING A SECURITY MONITOR

CROSS REFERENCE TO RELATED APPLICATIONS

This application claims benefit of priority under 35 U.S.C. 119(a)-(d) to a Russian Application No. 2021115238 filed on May 27, 2021, which is incorporated by reference herein.

FIELD OF TECHNOLOGY

The present invention relates generally to the technical field of data security and, more specifically, to a system and method for building a security monitor.

BACKGROUND

Modern operating systems (OS) are complex information systems with a plurality of deployed software applications for executing a wide variety of functions. In this context, software developers are constantly working to rectify errors and extend the functionality of software. Nonetheless, this variety of software entails significant data security risks, due to the presence of vulnerabilities in the software, and also due to the possibility of unsanctioned installation of malicious software (malware). The first level of defense against the aforesaid threats may be defensive means built into an OS, combined with features of the OS architecture. An OS provides mechanisms for processing, sharing and monitoring inter-process communication (IPC) which may be implemented, in particular, by exchanging messages between processes.

Many popular OSs (such as Windows, Linux, Android and others) use a monolithic kernel which has a number of advantages, including high throughput and easy communication between drivers. However, due to the large number of kernel software modules, and the consequent probability of errors in the code, it is difficult to ensure reliability and security in OSs with monolithic kernels. Therefore, if vulnerabilities are present in OSs or software, some undesired and harmful messages between processes may be permitted for processing and monitoring inter-process communications. One example of such harmful messages between processes is a message containing a request for access to a defended memory space.

Another type of OS kernel is a microkernel (for example, KasperskyOS, Symbian, and others), which provide a minimum set of elementary functions for controlling processes and provide abstractions for operation with hardware. The microkernel architecture of an OS is characterized by the small size of the microkernel and a trusted computing base. The aforementioned characteristics provide a higher level of reliability and security for the microkernel architecture of the OS, since the small volume of microkernel code is simpler to check for correctness. On the other hand, the microkernel architecture of the OS typically has a lower throughput. There are also OSs with hybrid kernels (such as MacOS X, Windows NT and others), which enable the operating system to exploit the advantages of a well-structured microkernel OS architecture, while retaining the throughput of a monolithic kernel.

Therefore, there is a need for operating systems to provide reliability and security for inter-process communications between processes. In other words, there is difficulty of providing control of the delivery of messages for inter-process communication, transmitted by the processes of OS applications, for the purpose of ensuring compliance with a specific security policy.

Conventional technology does not enable control for the delivery of messages for inter-process communication, transmitted by the processes of OS applications, for the purpose of ensuring compliance with a specific security policy.

Therefore, there is a need to devise a technology for resolving the difficulty of providing control of the delivery of messages for inter-process communications.

SUMMARY

Disclosed are systems and methods for building a security monitor. In one aspect, the security monitor designed for message delivery control using security policies increases security in the exchange of inter-process communication messages transmitted by OS application processes.

Another advantage is that the security monitor provides control of the delivery of inter-process communication messages transmitted by OS application processes, in accordance with security policies.

In one aspect, a method for building a security monitor includes identifying one or more objects of a microkernel Operating System (OS) participating in transmission of an Inter Process Communication (IPC) message. The one or more OS objects include one or more processes and/or one or more applications executed by the microkernel OS. One or more security policies associated with the identified microkernel OS objects are selected from a security policy database. A policy verification module is configured based on the selected security policies to generate a decision related to controlling the transmission of the IPC message. A security monitor is generated using the configured policy verification module to control the transmission of the message based on the decision generated by the policy verification module.

In one aspect, controlling the transmission of the IPC message comprises granting or denying the transmission of the IPC message from a message source to a message destination.

In one aspect, the IPC message comprises one of: a request for launching a process, a request for establishment of IPC session, and a request from a process to the security monitor.

In one aspect, the one or more microkernel OS objects further comprise one or more processes providing a service. The process includes at least one software component configured to implement a programming interface for the process. Communication with the process is performed using the programming interface.

In one aspect, the one or more microkernel OS objects further comprise a list of programming interfaces utilized for inter-process communication for each process executed by the microkernel OS.

In one aspect, generating the security monitor comprises generating a code for the security monitor. The code comprises one of: a source code, intermediate code, executable code.

In one aspect, analyzing the one or more security policies further comprises performing at least one of: lexical analysis, syntactic analysis, and semantic analysis of the one or more security policies.

In one aspect, the one or more security policies utilize at least one of the following models: basic operations model, finite state machine, timed automaton model, role-based access control model, mandatory integrity control model, regular expression model, discrete events model, object capability model, and temporal logic model.

In one aspect, the one or more security policies are combined into one or more classes. Each of the one or more classes comprises a set of semantically related policies that implement a specific security policy model.

In one aspect, if two or more security policies are associated with the IPC message a common decision is generated by performing conjunction of respective decisions for each of the two or more security policies.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for building a security monitor. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Glossary: A number of terms are defined herein which will be used to describe variant aspects of the present disclosure.

Process is a sequence of operations in the execution of a program or parts thereof, together with the data to be used during execution, including one or more threads and system resources associated with them.

Inter-process communication (IPC) is a set of methods for exchanging data between a plurality of threads in one or more processes. The processes may run on one or more computers interconnected by a network. IPC methods may be divided into message exchange, synchronization, shared memory and remote call methods.

Asynchronous process is a process in which an operation does not require a response in order to continue execution.

Synchronous process is a process in which an operation requires a response in order to continue execution.

Operation is an elementary action executed in the context of the respective process (one example of an operation is an Application Programming Interface (API) function).

Modern operating systems use both synchronous and asynchronous operations for exchanging data between two processes by IPC methods.

Finite state machine (FSM) is a model of a discrete device, characterized by states and transitions from one state to another. Each state of a finite state machine characterizes one of the possible situations in which the finite state machine may be.

Figure 1A:
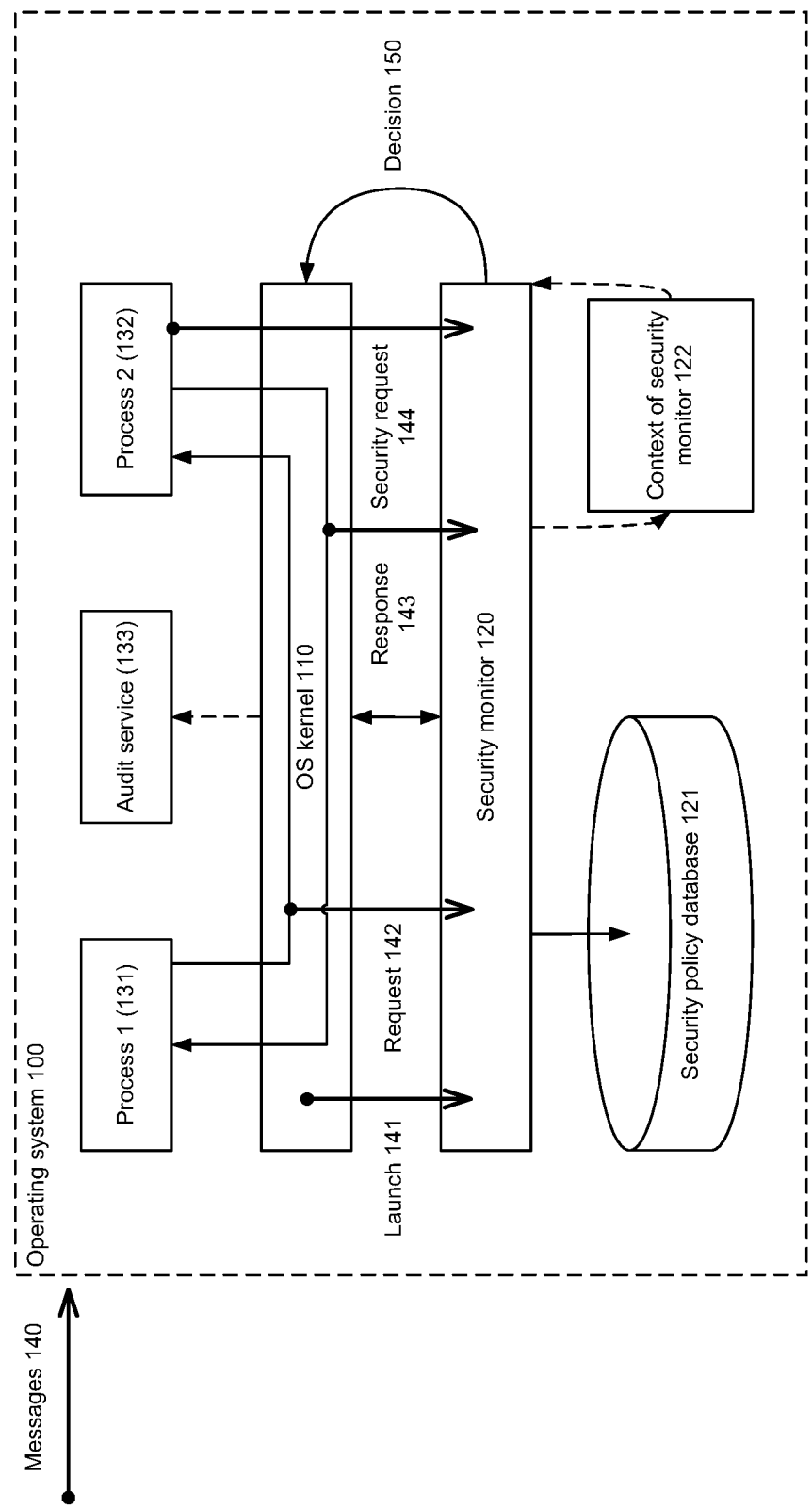
FIGS. 1A-1C illustrate an example of an operating system with microkernel architecture in which inter-process communication schemes utilize a security monitor.
Figure 1B:
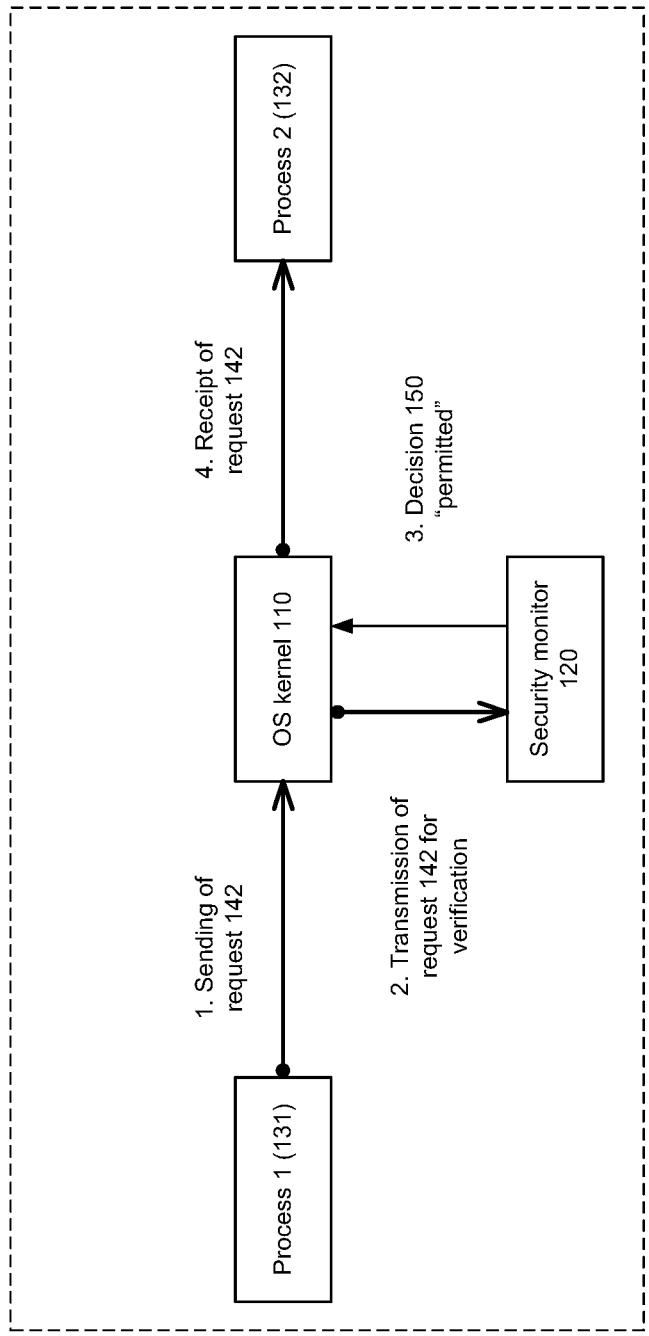
Figure 1C:
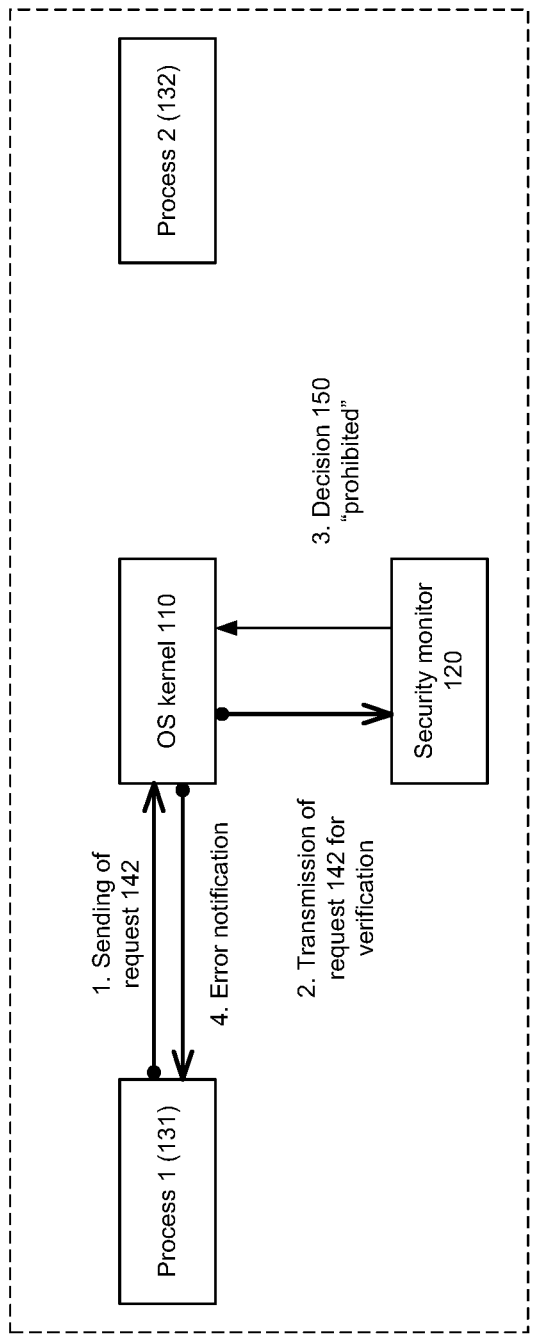

FIGS. 1A-1C illustrate an example of an operating system with microkernel architecture in which inter-process communication schemes utilize a security monitor. The OS 100 shown in FIG. 1*a* comprises isolated processes 131-132 of OS applications 100, which communicate with each other (using IPC), and also communicate with an OS kernel 110. The processes 131-132 may communicate via program interfaces by exchanging messages 140 (also known as inter-process communication messages or IPC messages), each indicated in FIGS. 1A-1C by an arrow originating at a point. The aforesaid interfaces to be implemented by the processes are described statically, and the permitted communications between the processes are specified in advance.

The exchange of messages by processes 131-132 may be carried out by means of system calls of the OS kernel 110.

System calls may include, but are not limited to:
call( ): used by a first process 131 to send a request 142 to a second process 132 and receive a response 143 from the second process 132 for implementation of IPC;
recv( ): used by the second process 132 in order to receive a request 142;
reply( ): used by the second process 132 to send a response 143 to the first process 131.

The security monitor 120 shown in FIG. 1A may comprise a component of the OS 100 configured to provide control of the delivery of said messages 140. A message 140 may include, but is not limited to: a request for the launch 141 of the first process 131, a request 142 from the first process 131 or a response 143 from the second process 132 (for example, a call by the first process 131 for a method of the second process 132), a request of the second process 132 to the security monitor 120 (security request 144). The messages 140 may include an error notification from the OS kernel 110 in response to messages from processes 131-132. When the security monitor 120 is used, the delivery of the messages 140 is controlled, by taking into account the decisions 150 taken on the basis of security policies from the security policy database 121.

Control of the delivery of a message 140 may include, but is not limited to, permitting or prohibiting the message 140, and, accordingly, permitting or prohibiting the execution of communication implemented using said message 140. The decision 150 about the method of controlling the delivery of the message 140 indicates permission for, or prohibition of, the transmission of the message 140 in the implementation of the security policy. In an aspect, the decision 150 may be used by the security monitor 120 or its components for executing said control of the delivery of the message 140 (see FIG. 2). Based on the specific security policies, the decision 150 may be carried out, using the data of message 140 (for example, the name of a process to be launched, or actual arguments of the called method of the process).

The decision 150 about the method of controlling the delivery of the message 140 may also depend on the correctness of the structure of said message 140. For example, if the message 140 contains a forbidden structure, the transmission of said message 140 may be prohibited. In this case, the permitted message structures may be defined using a declarative description of the interface between the process and the message recipient. Parameters of the permitted message structure may include, but are not limited to: a message size, permitted arguments and other permitted message parameters.

In a particular aspect, the security monitor 120 may be implemented as a component of the OS kernel 110 or may be implemented as a standalone application. In another aspect, the security monitor 120 may be executed in a privileged mode of the OS kernel 110.

In a particular aspect, the OS 100 may also include an audit service 133 configured to record the results of the control of the delivery of the messages 140 in a log. The message delivery control may also include the execution of an audit using the audit service 133. In yet another aspect, the security monitor 120 may perform additional control on the delivery of messages 140, taking into account the current status of the audit service 133. The status of the audit service 133 may indicate the readiness of the audit service 133 to receive a message 140. For example, if the first process 131 makes a request 142 to a defended resource (through the second process 132), where information on access to the defended resource should always be recorded in the log, but the status of the audit service 133 indicates that the audit service 133 is not currently storing messages, then such a request 142 will be prohibited by the security monitor 120, according to the security policy.

In yet another aspect, the OS 100 may include a context 122 of the security monitor 120. In an aspect, the security monitor 120 may perform an additional control on the delivery of the message 140, taking into account said context 122. In an aspect, the context 122 may include the values of the parameters of the security policies. In another particular aspect, the security monitor 120 may also be configured to change the context 122, taking into account the decisions 150 made on the basis of the security policies. In a particular aspect, the security policies may use a finite state machine model, a mandatory integrity control model, or other models for implementing the security policies. Depending on the aforementioned models used by the security policies, the context 122 may comprise various security policy parameters. For example, the context 122 for security policies based on a mandatory integrity control model may include values of integrity levels and levels of access to the defended objects. For security policies based on a finite state machine, the context 122 may include the current value of the state of the finite state machine and a table of transitions of the finite state machine.

FIG. 1B illustrates an example of the delivery of a permitted request 142 from the first process 131 to the second process 132. The first process 131 may call an interface method of the second process 132, for which the first process 131 sends a request 142 comprising the input arguments of the called method. The first process 131 may send the request 142 via the OS kernel 110, which in turn transmits the request 142 to the security monitor 120 for verification purposes. The security monitor 120 may generate the decision 150 "permitted" on the basis of the security policies, and may transmit the decision 150 to the OS kernel 110. On the basis of the decision 150, the kernel 110 may then transmit the request 142 to the second process 132.

In the above example illustrated in FIG. 1B, the second process 132 then sends a response 143 to the first process 131, where the response 143 comprises the input arguments of the called method. The method of sending the response 143 is analogous to the method of sending the request 142, but in the reverse order, from the second process 132 to the first process 131. In other words, the second process 132 may send the response 143 via the OS kernel 110, which in turn may transmit the response 143 to the security monitor 120 for verification purposes. The security monitor 120 may generate a new decision, "permitted", on the basis of the security policies, and may transmit said new decision back to the OS kernel 110. On the basis of the new decision, the kernel 110 may then transmit the response 143 back to the first process 131.

FIG. 1C illustrates an example of a prohibited request 142 from the first process 131 to the second process 132. The first process 131 may send the request 142 via the OS kernel 110, which in turn may transmit the request 142 to the security monitor 120 for verification. The security monitor 120 may generate the decision 150, "prohibited", on the basis of the security policies, and may transmit the decision 150 to the OS kernel 110. On the basis of the decision 150, the kernel 110 may then transmit an error notification to the first process 131. As shown in FIG. 1C, the request 142 will not be transmitted to the second process 132.

Figure 2:
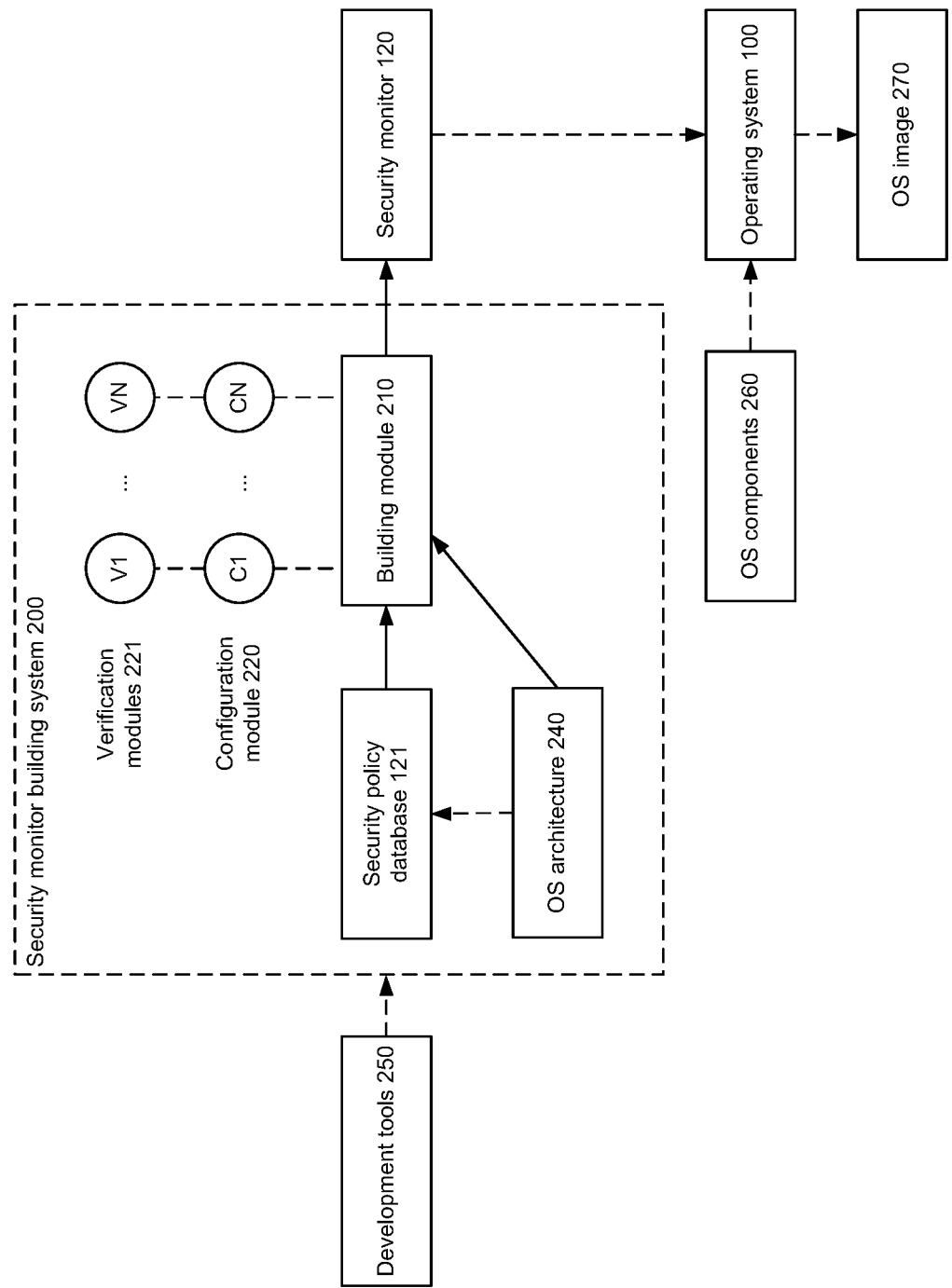
FIG. 2 illustrates an example architecture of a system for building a security monitor.

FIG. 2 illustrates an example architecture of a system for building a security monitor. The system for building the security monitor 200 may be used to increase the security of the OS 100 in the exchange of messages 140, and to provide control of the delivery of said messages 140 to the recipients. The security monitor 120 may be used by software developers in various operating systems 100, and/or in any other computer systems in which messages are exchanged, such as, but not limited to databases and application software. An example of such use was illustrated previously in FIGS. 1A-1C.

For each OS 100, a security monitor 120 may be configured, taking into account the distinctive features of the OS architecture 240 and the security requirements for the respective OS 100, which may be stated in the security policies. It should be noted that, for various developer software and hardware/software systems based on an OS 100 (referred to hereafter as "developer systems"), the main objects of the OS architecture 240, such as, but not limited to, the processes, services, applications and drivers responsible for the operation of the OS kernel 110 and other OS components 260, may be common. However, other objects of the OS architecture 240, responsible for the functionality of the developer system, may be tailored for each of said systems. Consequently, the security policies used for controlling the delivery of messages 140 may also be different. Developer systems may include software, and hardware/software combinations.

The system 200 may include a security policy database 121, configured for storing the security policies required for the control of the delivery of messages 140. The system 200 may also include at least one configuration module 220, designed for configuring its corresponding policy verification module 221 on the basis of the security policies received from the building module 210. The policy verification module 221 may be configured for generating a decision 150 about the method of controlling the delivery of a message 140 (referred to hereafter as a "decision") at the request of the security monitor 120 in the implementation of the security policy. The system 200 may also include a description of the OS architecture 240, including objects of the OS architecture 240, such as, but not limited to the processes and applications of the OS 100. In a particular aspect, the objects of the OS architecture 240 may also include the objects of the developer system based on the OS 100. In yet another aspect, the objects of the OS architecture may also include, but are not limited to:

a process providing a service, and including at least one software component configured for implementing a programming interface for said process, the communication with said process taking place via said interface (for example, such a service may be an application translating a stream of external events and a request for the event processing process);

a list of programming interfaces for each process. Corresponding interface methods implementing functionality of the corresponding process may also be indicated.

In yet another aspect, another object of the OS architecture 240 may be a resource driver, which may be a process controlling resources and access to them. In particular, a resource is a file, a port or a process. For example, a file system is a resource driver, and the files themselves are resources, access to which may be granted to other processes.

In addition, the system 200 may include a building module 210, configured for analyzing the security policies. The analysis of the security policies may consist, in particular, of the identification of processes for which said security policy is used. In an aspect, the analysis may take into account the objects of the OS architecture 240, including said processes and applications. The building module 210 may also be configured to select security policies from the policy database 121 for corresponding configuration module 220, and to transmit at least one selected security policy to a corresponding configuration module 220. The building module 210 may also be configured to build a security monitor 120, using built-in policy verification modules 221 received from each configuration module 220 based on the results of the analysis. In an aspect, the building module 210 may build the security monitor 120 by creating a code for the security monitor 120. The built code may be, but is not limited to, source code, intermediate code or executable code. Additionally, the building of the code for the security monitor 120 may include code optimization and analysis of the code for errors. Thus, the building module 210 may be a compiler building the code of the security monitor 120.

The OS architecture 240, the security policy database 121, and the configuration module 220 may be configured in advance using the development tools 250. For this purpose, the development tools 250 may provide a set of APIs or ready-made modules for developing software. In an aspect, at least some of the objects of the OS architecture 240, some of the security policies from the security policy database 121, and some of the configuration modules 220 may be common (templates) for different OSs 100. In this case, the developer, using the development tools 250, may configure the configuration module 220, the objects of the OS architecture 240 and the security policies from the security policy database 121, by adding to said template the security policies, objects of the OS architecture 240, and configuration module 220, that are absent from the template but are required in order to reflect the distinctive features of the OS 100 or of the developer system. The developer may make such changes to the template based on the OS 100 and the security requirements for the OS 100 or for the developer system based on the OS 100, respectively, for which said developer is building the security monitor 120. Additionally, some of the data from the template may be removed if it will not be required in the OS 100, or in a developer system based on the OS 100. For example, some security policies and applications may be removed.

The completed security monitor 120, together with the other components of the OS 260, may then be included in the operating system 100. Said inclusion of the security monitor 120 and the OS components 260 may be implemented by methods now or later developed. For example, the security monitor 120 may be implemented at the stage of the compilation of the OS 100, using the compiler of the OS 100, or by installing the security monitor 120 in the OS 100. As mentioned above, the security monitor 120 may be a part of the OS kernel 110 or a standalone application of the OS 100. The security monitor 120 may be executed in a privileged mode of the OS kernel 110. An installation image of the OS 270 may also be created for the OS 100. The installation image 270 may be required for installing the OS 100 in the computer equipment of the end users. The installation image of the OS 270 may be, for example, an executable file or an installation package. The installation package is an archive file including the files of the OS 100, control files, and optionally files for the OS installation process configuration 110. In addition, the installation package may include files of the developer system based on the OS 100. Such files may be provided in source code, intermediate code or executable code.

Figure 3:
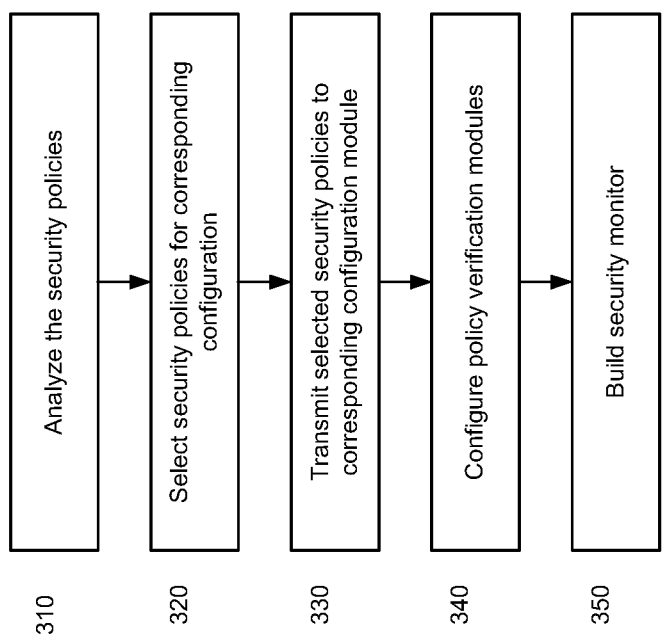
FIG. 3 illustrates an example of method for building a security monitor.

FIG. 3 illustrates a method for building a security monitor. At step 310, the building module 210 may analyze the security policies from the policy database 121. Such analysis may consist, in particular, of a comparison of the security policies 121 with the objects of the OS architecture 240. For example, the building module 210 may define the processes for which said security policy is used. In addition, to the building module 210 may select only those security policies 121 that correspond to the existing processes in the OS architecture 240 or in the developer system based on the OS 100. Description of various security policies is provided below.

Next, at step 320, the building module 210 may select security policies from the policy database 121 for the corresponding configuration module 220. At step 330, the building module 210 may transmit at least one selected security policy to a corresponding configuration module 220.

Subsequently, in an aspect, at step 340, the building module 210 may automatically configure the policy verification modules 221, in coordination with the corresponding configuration module 220. Such automatic configuration may include, but is not limited to, the addition of the selected security policies to the policy verification modules 221.

Finally, at step 350, the building module 210 may generate (build) a security monitor 120, using built-in policy verification modules 221 based on the results of the analysis, as described below.

In summary, various aspects of the present disclosure advantageously improves OS security in the exchange of inter-process communication messages transmitted by OS application processes, by generating a security monitor configured for message delivery control using security policies. In addition, the generated security monitor may provide control of the delivery of inter-process communication messages transmitted by the OS application processes, in accordance with the security policies.

In an aspect, the building module 210 may generate the security monitor 120 by creating (generating) a code for the security monitor 120. The code generated by the building module 210 may be a source code, an intermediate code or an executable code. In an aspect, the policy verification module 221 may also be sections of code included in the code of the security monitor 120.

DESCRIPTION OF THE SECURITY POLICIES

In an aspect, the security policies may use at least one of the following models:

basic operations;
finite state machine;
timed automaton;
role-based access control;
mandatory integrity control;
regular expression;
discrete event systems (DES);
object capability models (capability-based operations);
temporal logic.

Mandatory Integrity Control (MIC) model may apply a mandatory security policy in regards to the trustworthiness of a subject (e.g. user or application file etc.). MIC enforces access security based on the integrity of subjects and objects. MIC may be designed to protect the computer system and user data from unauthorized modification by untrustworthy subjects, or untrustworthy code run by privileged subjects.

A discrete event system (DES) modeling environment may be used for modeling the occurrence of events independent of continuous model time. In an DES modeling environment, state transitions depend not on time, but rather asynchronous discrete incidents known as events.

Object capability model may be used to allow or deny execution of operation with object based on capability to the object. The capability refers to a value that references an object along with an associated set of access rights. In order to execute any operation with object, its capability should contain corresponding access rights.

The security policies 121 may be specified using a specification language such as, but not limited to, PSL (Policy Specification Language) and eXtensible Access Control Markup Language ("XACML"). In the PSL example, mandatory integrity control may be specified by the policy class Mandatory_integrity_control. The class (family) of security policies may determine a number of rules corresponding to the rules of the model used in the security policy. The specification of the security policy may determine the correspondence of said rules and communications in the system that may be provided by the exchange of messages 140 between processes. For each communication attempt, when the security monitor 120 verifies a message 140, the security monitor 120 may follow the rules for generating a decision as to the permissibility of the communication in question (delivery of the message 140). To use the policy class, a policy object may be created on the basis of the class, and the configuration of the policy object may be specified.

In an aspect, the analysis of the security policies and the objects of the OS architecture 240 may include but is not limited to at least one of the following forms of analysis: lexical analysis, syntactic analysis (parsing), and semantic analysis. The result of the security policy analysis is the determination of the objects of the OS architecture 240. More specifically, by analyzing the security policies, the building module 210 may determine the processes participating in the exchange of messages 140, for which a particular security policy is used. In other words, the correspondence between the identified objects of the OS architecture 240 and the security policy used for the objects may be determined. For example, if the security policy permits a request 142 from a first process 131 to a second process 132, then, as a result of the analysis of this security policy, said first and second processes 131-132 and the information about the permitted request 142 may be identified. It should be noted that, as a result of the security policy analysis, the building module 210 may identify other objects of the OS architecture 240 may be checked in the security policy. For example, the identified objects may be process interface methods, when a message 140 is addressed to a respective method and may be transmitted via the process interface. In this case, the security policies may be checked against the condition that the specified process interfaces and the specified interface methods are used in the exchange of messages 140 between defined processes.

In the example of PSL, which may be used for the specification of the security policies 121, the reference to the first process 131, which is the source of the request 142, may be contained in the variable scr. The reference to the second process 132, which is the recipient of the request 142, may be contained in the variable dst. Correspondingly, the analysis of security policies 121, written in PSL, may be used to determine specified objects of the OS architecture for which the specified security policy may be used.

In another aspect, the analysis of the security policies 121 may include a check on the types of objects of the OS architecture 240, as well as an analysis of errors in the security policies 121.

In an aspect, the building module 210 may utilize the results of the aforementioned analysis when building of the security monitor 120 (step 350). For example, the conditions for the use of the security policies, in the form of a list of objects of the OS architecture 240, particularly the processes, and the security policies corresponding to the list of objects, together with the policy verification modules 221, may be recorded in the security monitor 120. Accordingly, when a message 140 is received from the OS kernel 140, the generated security monitor 120 may determine the objects of the OS architecture 240 that are participating in the exchange of the message 140, and then may determine the security policies that may be used for the identified objects of the OS architecture 240. The security monitor 120 may transmit the message 140 to the policy verification modules 221, according to said security policies, so that a decision can be made regarding the method of control of the delivery of the message 140.

In yet another aspect, a syntactic analysis may be performed by constructing a syntax tree for the code of the security monitor 120. In an aspect, the constructed syntax tree may include the code of the policy verification modules 221 created by at least one configuration modules 220.

The security policies may use the basic operations that permit or prohibit the transmission of a message 140 subject to the conformity of the parameters of the message 140. For example, the building module 210 may compare the name of a process to be launched, or actual arguments of the called method with the data specified in the security policy. In this example, the security policy may determine that the first process 131 can receive any messages, but that the first process 131 is prohibited from sending messages.

The security policies may also use a finite state machine, where the security policy determines the permission or prohibition of the delivery of the message 140 according to the state of the finite state machine and in accordance with the state transition table of the finite state machine.

A timed automata model, and particularly a timed automaton of the event-recording automata (ERA) type, is a particular instance of a finite state machine. In this model, a time parameter (timer) may also be specified for each message. This time parameter may indicate the time elapsed after the moment of the last receipt of this message. For example, a transition from one state of the finite state machine to another state may be executed if the message was received after the time set by the timer.

A mandatory integrity control model may be used for permitting or prohibiting the delivery of a message 140. According to the mandatory access control model, the security monitor 120 may establish two numbers, called the integrity level and the access level, for objects of the OS architecture 240, such as the processes 131-132, participating in the transmission of the message 140. Permission for the delivery of a message from one object to another may be obtained by using security policies based on mandatory integrity control. In other words, the building module 210 may generate permission for the delivery of a message using the values of integrity levels and access levels of the objects. For example, it may be possible to use a security policy according to which one object is permitted to communicate with another object if the value of the access level of the first object is not less than the value of the integrity level of the other object. In the PSL specification language, integrity levels and access levels may be specified for the mandatory integrity control model. Accordingly, in order to specify the integrity levels, a policy object "integrity" may be determined. The integrity object may be a member of the class Mandatory_integrity_control:

```
policy object integrity =
    Mandatory_integrity_control {
        Config {
            levels : ["LOW", "MEDIUM", "HIGH"]
        }
    }
```

In an aspect, three integrity levels may be specified in the configuration of the policy object "integrity": LOW, MEDIUM and HIGH, in increasing order. In other words, LOW<MEDIUM<HIGH.

Policies based on object capability models operate on the principle of minimal privileges. This principle of organization of access to resources signifies that a subject (process or user) is provided with only those privileges that are absolutely necessary for the successful execution of a task. For example, a user wishing to discover the content of a file may be granted only the rights to read this file, and only for the period of the use of this file.

In order to specify security policies based on temporal logic, the security properties (requirements) may be formulated using formulas of temporal logic that employ temporal operators. The security monitor 120 may be used to assign to objects of the OS architecture 240 participating in the transmission of the message 140, (e.g. the processes 131-132), the events of their state, selected from a previously determined number of states.

As a non-limiting example, security policies based on temporal logic may be used for the process of installing software from a software image. A number of components (i.e. the processes 131-132) may take part in the installation process, for example a checking module and an installation module. The software installation process may include a check on the integrity of the software image, which may be performed by a checking module. Next, the installation module may install the software from a software image, if the integrity of the software image has not been impaired. The integrity of a software image indicates the consistency, completeness and preservation of the data of the software image. In an aspect, the integrity check of the software image may be carried out by checking an electronic digital signature of the software image. For the software image, a plurality of events may include, but are not limited to the following: {seal, verify, apply}, where seal is the event of "sealing" the software image, verify is the event of verifying the integrity of the software image, and apply is the event of installing the software from the software image. The security properties may be formulated, for example, as follows:

Property 1. When the integrity of the software image is verified, the checking module should ensure that said the verified software image will not be changed after verification of the integrity of the software image. This property may be written as formula (1):

$$G(\text{verify} \Rightarrow P \text{ seal}), \tag{1}$$

where G is the temporal operator "always in future", and P is the temporal operator "even once in the past". Property 1 signifies that, when the integrity of the software image has been verified in the past, no further data should be written to the software image.

Property 2. The installation of the software from the software is permitted only if it is supported by the integrity of the software image. This property may be written as formula (2):

$$G(\text{apply} \Rightarrow P \text{ verify}). \tag{2}$$

The creation of an object of a class of policies that controls access on the basis of temporal logic may be carried out in PSL in the form of the following construction:

```
policy object tl_checker = TL {
    config "G (verify => P seal) /\ G (apply => P verify)"
}
```

It should be noted that examples presented herein are for illustrative purposes only and other formulations of the properties are possible. For example, property 2 may be specified as follows: the software image is not to be applied unless it is supported by the integrity of the software image:
    !apply U verify,
    where U is the temporal operator "until the specified event commences".

For the installation of software, a policy based on a temporal logic model the installation module may associate an "apply" event with a specified inter-process communication, and may check the validity of the formula specified in the configuration of the policy object. If the formula is valid, the policy may permit the communication; if the formula is invalid, the policy prohibits it.

Policies based on a discrete events model may be specified using a verification module 221 corresponding to the policies. Such security policies may also be written in the PSL specification language. These security policies may be applied for developer systems consisting of large numbers of components. For a discrete events model system of the aforesaid type, the result is a finite state machine which is specified by a combination of a plurality of finite state machines, each of which is described by a separate component of the system. For each finite state machine, a plurality of their properties and the transitions between them on the occurrence of specified events may be given. The state of the resulting finite state machine may be determined by a combination of states of finite state machines of components of the system. Such combination may be created, for example, by synchronous or asynchronous products of finite state machines. A list of permitted transitions, a list of permitted states and a list of prohibited states of the resulting finite state machine may also specified for the resulting finite state machine. Accordingly, the security policies may be used to check the transition of the finite state machines of components of the system and the resulting finite state machine in the initial state determined in the configuration of the corresponding finite state machine, check the transition between states on the occurrence of a specified event, and check the presence of the corresponding finite state machine in one of the specified states.

In yet another aspect, different configuration modules 220 may be chosen for security policies using different models. For example, the security policies may be combined in classes of policies. A class of security policies is a set of semantically related policies that implement a specific security policy model. The first class of policies may consist of security policies using a finite state machine, while the second class of policies may consist of security policies using mandatory integrity control. In this example, a configuration module 1 may be selected for the first class of security policies, while a configuration module 2 may be selected for the second class of security policies. The aspect described here enables development of a configuration module 220 designed for configuring verification modules 221 for security policies from one class. Additionally, when a new security policy is added to the policy database 121, an existing configuration module 220 may be used, with no need to improve it or to add a new configuration module 220.

In yet another aspect, the building module 210 may also include the context 122 of the security monitor 120 in the code of the security monitor 120. In this case, the security monitor 120 may perform a further control on the delivery of the message 140, taking into account the context 122. The context 122 of the security monitor 120 may comprise the values of the parameters of the security policies.

In another aspect, the security monitor may also be designed to change the context 122, taking into account the decisions 150 made on the basis of the security policies. Depending on the aforesaid models used by the security policies, the context 122 may comprise various security policy parameters. For example, the context 122 for security policies based on a mandatory integrity control model may comprise values of integrity levels and levels of access to the defended objects. For security policies based on a finite state machine, the context 122 may comprise the current value of the state of the finite state machine and a table of transitions of the finite state machine.

In an aspect, if there are at least two security policies corresponding to a message 140, a common decision may also be calculated for the security policies by conjunction of the decisions for each of the security policies. The security monitor 120 may provide an additional control on the delivery of the message 140 by taking this common decision into account. When the first process 131 or the second process 132 initiates communication by sending a message 140, the security monitor 120 may call all the security policies associated with this specific communication from the policy database 121. If all the security policies issue the decision "permitted", then the common decision "permitted" may be issued via the security monitor 120. If at least one policy has issued the decision "prohibited", then the common decision "prohibited" may be issued by the security monitor 120.

In yet another aspect, the configuration of the policy verification module 221 may include the creation of a code enabling a decision 150 to be issued at the request of the security monitor 120 for the security policy when the security policy is implemented.

In an aspect, the security monitor 120 may provide additional control of the delivery of the message 140, by taking into account the decision 150, on the basis of the security policies associated with the messages 140.

Figure 4:
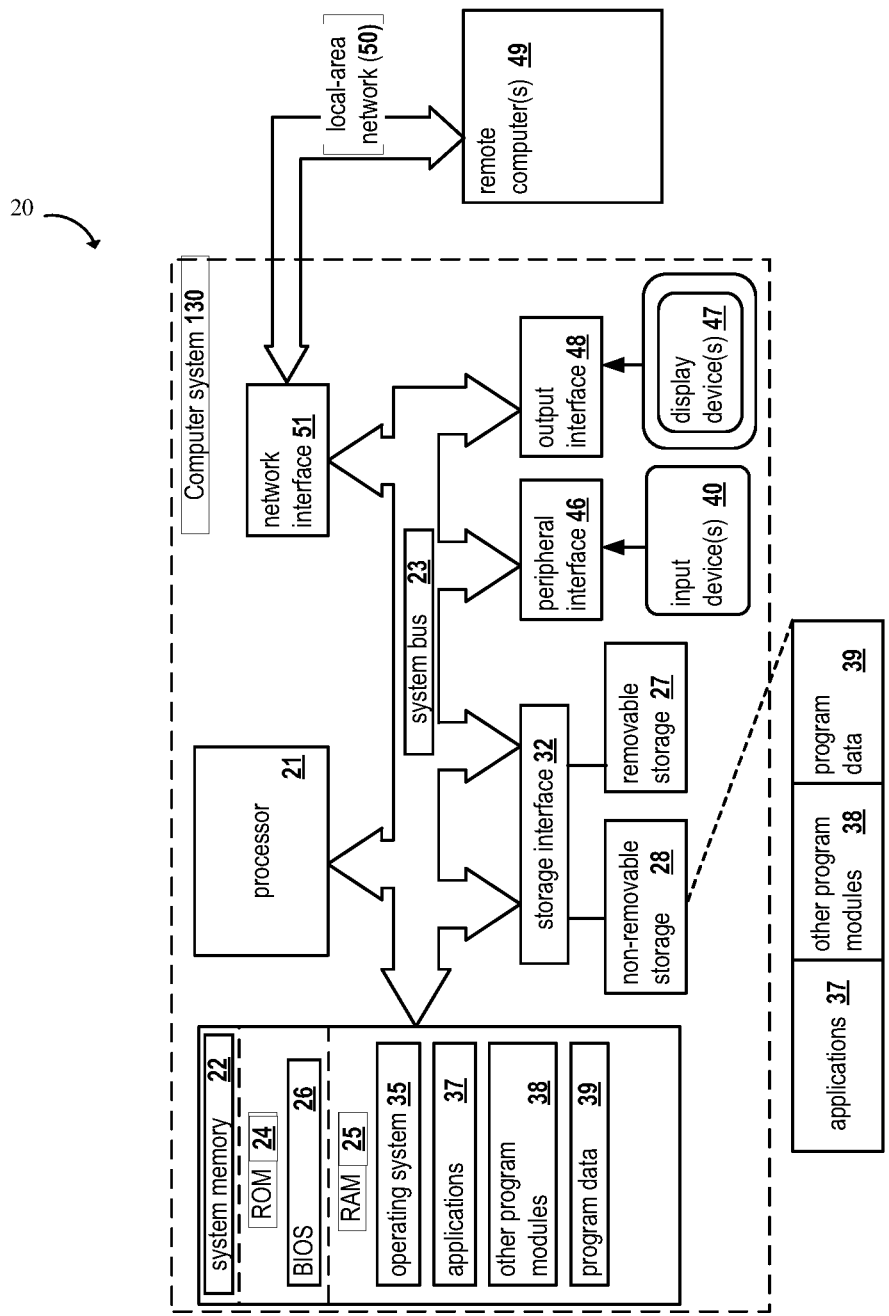
FIG. 4 shows an example of a computer system on which variant aspects of systems and methods disclosed herein may be implemented.

FIG. 4 shows an example of a computer system 20 on which variant aspects of systems and methods disclosed herein may be implemented. The computer system 20 may represent the system for building a security monitor 200 of FIG. 2 and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for building a security monitor, the method comprising:
identifying one or more objects of a microkernel Operating System (OS) participating in the transmission of an inter-process communication (IPC) message, wherein the one or more OS objects comprise at least one or more processes or one or more applications executed by the microkernel OS;
selecting, from a security policy database, one or more security policies associated with the identified microkernel OS objects;
configuring a policy verification module based on the selected security policies to generate a decision related to controlling the transmission of the IPC message; and
generating, using the configured policy verification module, a security monitor to control the transmission of the IPC message based on the decision generated by the policy verification module, wherein the security monitor is implemented as a component of the microkernel OS.

2. The method of claim 1, wherein controlling the transmission of the IPC message comprises granting or denying the transmission of the IPC message from a message source to a message destination.

3. The method of claim 1, wherein the IPC message comprises one of: a request for launching a process, a request for establishment of IPC session, and a request from a process to the security monitor.

4. The method of claim 1, wherein the one or more microkernel OS objects further comprise one or more processes providing a service, wherein the process includes at least one software component configured to implement a programming interface for the process and wherein communication with the process is performed using the programming interface.

5. The method of claim 4, wherein the one or more microkernel OS objects further comprise a list of programming interfaces utilized for inter-process communication for each process executed by the microkernel OS.

6. The method of claim 1, wherein generating the security monitor comprises generating a code for the security monitor, wherein the code comprises one of: a source code, intermediate code, executable code.

7. The method of claim 1, wherein analyzing the one or more security policies further comprises performing at least one of: lexical analysis, syntactic analysis, and semantic analysis of the one or more security policies.

8. The method of claim 1, wherein the one or more security policies utilize at least one of the following models: basic operations model, finite state machine, timed automaton model, role-based access control model, mandatory integrity control model, regular expression model, discrete events model, object capability model, and temporal logic model.

9. The method of claim 8, wherein the one or more security policies are combined into one or more classes and wherein each of the one or more classes comprises a set of semantically related policies that implement a specific security policy model.

10. The method of claim 1, wherein if two or more security policies are associated with the IPC message a common decision is generated by performing conjunction of respective decisions for each of the two or more security policies.

11. A system for building a security monitor, the system comprising:
a hardware processor configured to:
identify one or more objects of a microkernel Operating System (OS) participating in the transmission of an inter-process communication (IPC) message, wherein the one or more OS objects comprise one or more processes and/or one or more applications executed by the microkernel OS;
select from a security policy database one or more security policies associated with the identified microkernel OS objects;
configure a policy verification module based on the selected security policies to generate a decision related to controlling the transmission of the IPC message; and
generate a security monitor using the configured policy verification to control the transmission of the IPC message based on the decision generated by the policy verification module, wherein the security monitor is implemented as a component of the microkernel OS.

12. The system of claim 11, wherein controlling the transmission of the IPC message comprises granting or denying the transmission of the IPC message from a message source to a message destination.

13. The system of claim 11, wherein the IPC message comprises one of: a request for launching a process, a request for establishment of IPC session, and a request from a process to the security monitor.

14. The system of claim 11, wherein the one or more microkernel OS objects further comprise one or more processes providing a service, wherein the process includes at least one software component configured to implement a programming interface for the process and wherein communication with the process is performed using the programming interface.

15. The system of claim 14, wherein the one or more microkernel OS objects further comprise a list of programming interfaces utilized for inter-process communication for each process executed by the microkernel OS.

16. The system of claim 11, wherein generating the security monitor further comprises generating a code for the security monitor, wherein the code comprises one of: a source code, intermediate code, executable code.

17. The system of claim 11, wherein analyzing the one or more security policies further comprises performing at least one of: lexical analysis, syntactic analysis, and semantic analysis of the one or more security policies.

18. The system of claim 11, wherein the one or more security policies utilize at least one of the following models: basic operations model, finite state machine, timed automaton model, role-based access control model, mandatory integrity control model, regular expression model, discrete events model, object capability model, and temporal logic model.

19. The system of claim 18, wherein the one or more security policies are combined into one or more classes and wherein each of the one or more classes comprises a set of semantically related policies that implement a specific security policy model.

20. The system of claim 11, wherein if two or more security policies are associated with the IPC message a common decision is generated by performing conjunction of respective decisions for each of the two or more security policies.

21. A non-transitory computer readable medium storing thereon computer executable instructions for building a security monitor, including instructions for:
- identifying one or more objects of a microkernel Operating System (OS) participating in the transmission of an inter-process communication (IPC) message, wherein the one or more OS objects comprise one or more processes and/or one or more applications executed by the microkernel OS;
- selecting from a security policy database one or more security policies associated with the identified microkernel OS objects;
- configuring a policy verification module based on the selected security policies to generate a decision related to controlling the transmission of the IPC message; and
- generating a code for a security monitor using the configured policy verification module to control the transmission of the IPC message based on the decision generated by the policy verification module, wherein the security monitor is implemented as a component of the microkernel OS.

* * * * *